United States Patent
Akdemir et al.

(10) Patent No.: US 9,880,856 B2
(45) Date of Patent: Jan. 30, 2018

(54) PATCHING BOOT CODE OF READ-ONLY MEMORY

(71) Applicant: Marvell World Trade Ltd., St. Michael (BB)

(72) Inventors: Kahraman D. Akdemir, Franklin, MA (US); Tolga Nihat Aytek, Framingham, MA (US); Deniz Karakoyunlu, Boston, MA (US)

(73) Assignee: Marvell World Trade Ltd., St. Michael (BB)

( * ) Notice: Subject to any disclaimer, the term of this patent is extended or adjusted under 35 U.S.C. 154(b) by 32 days.

(21) Appl. No.: 14/180,030

(22) Filed: Feb. 13, 2014

(65) Prior Publication Data
US 2014/0244991 A1 Aug. 28, 2014

Related U.S. Application Data

(60) Provisional application No. 61/768,097, filed on Feb. 22, 2013.

(51) Int. Cl.
*G06F 9/44* (2006.01)
*G06F 9/445* (2006.01)

(52) U.S. Cl.
CPC .............. *G06F 9/4406* (2013.01); *G06F 8/66* (2013.01); *G06F 9/4401* (2013.01)

(58) Field of Classification Search
CPC ........ G06F 9/4406; G06F 8/66; G06F 9/4401; G06F 9/328; G06F 9/322
See application file for complete search history.

(56) References Cited

U.S. PATENT DOCUMENTS 4,831,517 A * 5/1989 Crouse ...................... G06F 8/66
712/E9.075
5,901,225 A * 5/1999 Ireton ...................... G06F 9/328
714/6.32

(Continued)

FOREIGN PATENT DOCUMENTS

| JP | 04-346127 | 12/1992 |
| JP | 10-232772 | 9/1998 |
| JP | 2001-256044 | 9/2001 |
| JP | 2007-102791 | 4/2007 |

OTHER PUBLICATIONS

"When to Clear Interrupt Flag?" Forum. Microchip Technology Inc., Mar. 16, 2011. Web. Apr. 25, 2016. (http://www.microchip.com/forums/m566259.aspx).*
Corbet, Jonathan, Alessandro Rubini, and Greg Kroah-Hartman. Linux Device Drivers. N.p. O'Reilly, 2005.*
Arnold, Ken. "Ch. 9, Excerpts." Embedded Controller Hardware Design. Amsterdam: Newnes, 2004. N. pag. Print.*
Sherwood, Timothy, and Brad Calder. "Patchable Instruction Rom Architecture." Proceedings of the International Conference on Compilers, Architecture, and Synthesis for Embedded Systems—CASES '01 (2001): n. pag. Web. Mar. 23, 2017.*
"International Search Report and Written Opinion", Application No. PCT/US2014/16259, dated Apr. 1, 2014, 10 Pages.
"Foreign Office Action", EP Application No. 17083481.0, dated Sep. 29, 2015, 2 pages.
"Foreign Office Action", JP Application No. 2015-558880, dated Nov. 28, 2017, 6 pages.

*Primary Examiner* — Jaweed A Abbaszadeh
*Assistant Examiner* — Brian J Corcoran (57) ABSTRACT

The present disclosure describes apparatuses and techniques for patching boot code of read-only memory (ROM). In some aspects, execution of boot code from a ROM is initiated to start a boot process of a device. Execution of the boot code from the ROM is then interrupted to enable execution of other boot code, such as corrected boot code or additional boot code, from another memory. Once the other boot code is executed, execution of the boot code from the ROM is resumed to continue booting the computing device. By so doing, the corrected boot code or additional boot code can be executed during the boot process effective to patch the boot code stored in the ROM.

20 Claims, 7 Drawing Sheets (56) References Cited

U.S. PATENT DOCUMENTS

| | | | |
|---|---|---|---|
| 6,237,120 B1* | 5/2001 | Shimada | G06F 8/66 |
| | | | 714/726 |
| 7,739,469 B2* | 6/2010 | Jessani | G06F 9/328 |
| | | | 711/103 |
| 2002/0062479 A1* | 5/2002 | Takata | G06F 8/66 |
| | | | 717/168 |
| 2002/0120810 A1 | 8/2002 | Brouwer | |
| 2003/0051119 A1* | 3/2003 | Li | G06F 8/66 |
| | | | 711/210 |
| 2004/0210720 A1* | 10/2004 | Wong | G06F 8/60 |
| | | | 711/132 |
| 2006/0107104 A1* | 5/2006 | Alexandre | G06F 9/30149 |
| | | | 714/6.13 |
| 2006/0265692 A1* | 11/2006 | Su | G06F 8/66 |
| | | | 717/124 |
| 2007/0028083 A1 | 2/2007 | Yu et al. | |
| 2007/0133248 A1* | 6/2007 | Chen | G11C 17/16 |
| | | | 365/96 |
| 2008/0112205 A1* | 5/2008 | Saado | G06F 9/322 |
| | | | 365/94 |
| 2008/0263533 A1* | 10/2008 | Huque | G06F 8/66 |
| | | | 717/168 |
| 2009/0327650 A1* | 12/2009 | Neuerburg | G06F 9/322 |
| | | | 711/219 |
| 2010/0106953 A1 | 4/2010 | Morade et al. | |
| 2010/0180104 A1* | 7/2010 | Henry | G06F 8/66 |
| | | | 712/208 |
| 2011/0252413 A1* | 10/2011 | Maeda | G06F 8/66 |
| | | | 717/168 |
| 2012/0216028 A1* | 8/2012 | Amini | G06F 21/564 |
| | | | 713/100 |

* cited by examiner

Fig. 7

PATCHING BOOT CODE OF READ-ONLY MEMORY

RELATED APPLICATIONS

This present disclosure claims priority to U.S. Provisional Patent Application Ser. No. 61/768,097 filed Feb. 22, 2013 the disclosure of which is incorporated by reference herein in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing and electronic devices often execute boot code on power-up to configure resources or components of the device. Once the resources and components are configured, an operating system is loaded by the boot code and executed. Control of the device is then passed to the executing operating system, which implements functionalities or applications of the device.

To prevent the execution of unauthorized software on the device, the boot code can verify an authenticity of the operating system and software layers above the boot code. Because the boot code is the lowest level of code executed at power-on, the boot code is often hard-coded into hardware of the device to ensure authenticity of the boot code. While hard-coding the boot code prevents malignant modification of the boot code, the hard-coding also prevents modification of the boot code to correct errors. Thus, to correct an error in the boot code, the hardware of the device often requires re-design and re-fabrication, which consumes considerable time, money, and resources.

SUMMARY

The details of one or more implementations are set forth in the accompanying drawings and the description below. Other features and advantages will be apparent from the description and drawings. As such, this Summary should not be considered to describe essential features nor used to limit the scope of the claimed subject matter.

A method is described for initiating, from a read-only memory (ROM), execution of first boot code to start a boot process of a computing device. The method then interrupts the execution of the first boot code to enable execution of second boot code from another memory. After the second boot code is executed, the execution of the first boot code is resumed to continue the boot process of the computing device.

Another method is described for initiating execution of boot code from a ROM, the execution of the boot code being advanced via a program counter. Responsive to the program counter reaching a predetermined address in the boot code, execution of the boot code is interrupted. The method then executes alternate boot code from a one-time-programmable (OTP) memory instead of some of the boot code in the ROM. Responsive to execution of the alternate boot code, the program counter is returned to an address in the boot code effective to resume execution of the boot code from the ROM.

A System-on-Chip (SoC) is described that includes a processor, ROM, OTP memory, and an interrupt manager that is configured to interrupt the processor's execution of boot code from the ROM in response to a program counter of the processor encountering a predetermined address in the boot code. The interrupt manager is further configured to cause the processor to execute additional boot code from the OTP memory and then return the program counter to an address in the boot code effective cause the processor to resume execution of the boot code from the ROM.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional techniques for patching boot code of read-only memory (ROM) typically require re-fabrication of ROM hardware in which the boot code is written (e.g., burned). This re-fabrication of the ROM hardware often includes another round of pre-silicon verification, silicon tape-out or masking, ROM porting, manufacture of ROM hardware, and post-silicon verification. As such, the re-fabrication of ROM hardware to patch boot code consumes a considerable amount of time, money, and resources.

This disclosure describes apparatuses and techniques for patching boot code in ROM, which enable other boot code (e.g., alternate or additional boot code) to be executed from another memory during a boot process. In some aspects, the other memory is one-time-programmable (OTP) memory, into which the other boot code is burned after fabrication of hardware that includes the ROM. When the boot code is embodied in a System-on-Chip (SoC), the SoC may provide a lockout mechanism for the other code (e.g., patching code). For example, if no patching is determined to be necessary after verification of the boot code (e.g., BootROM) prior to shipping a product in which the boot code is embodied, the SoC may provide a capability to disable the feature to ensure security of the boot code through the life of the product. Similarly, if patching of the boot code is necessary, the SoC may provide another capability for locking out remaining blocks of the OTP memory once patched but prior to shipment of the hardware to ensure security of the other boot code.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
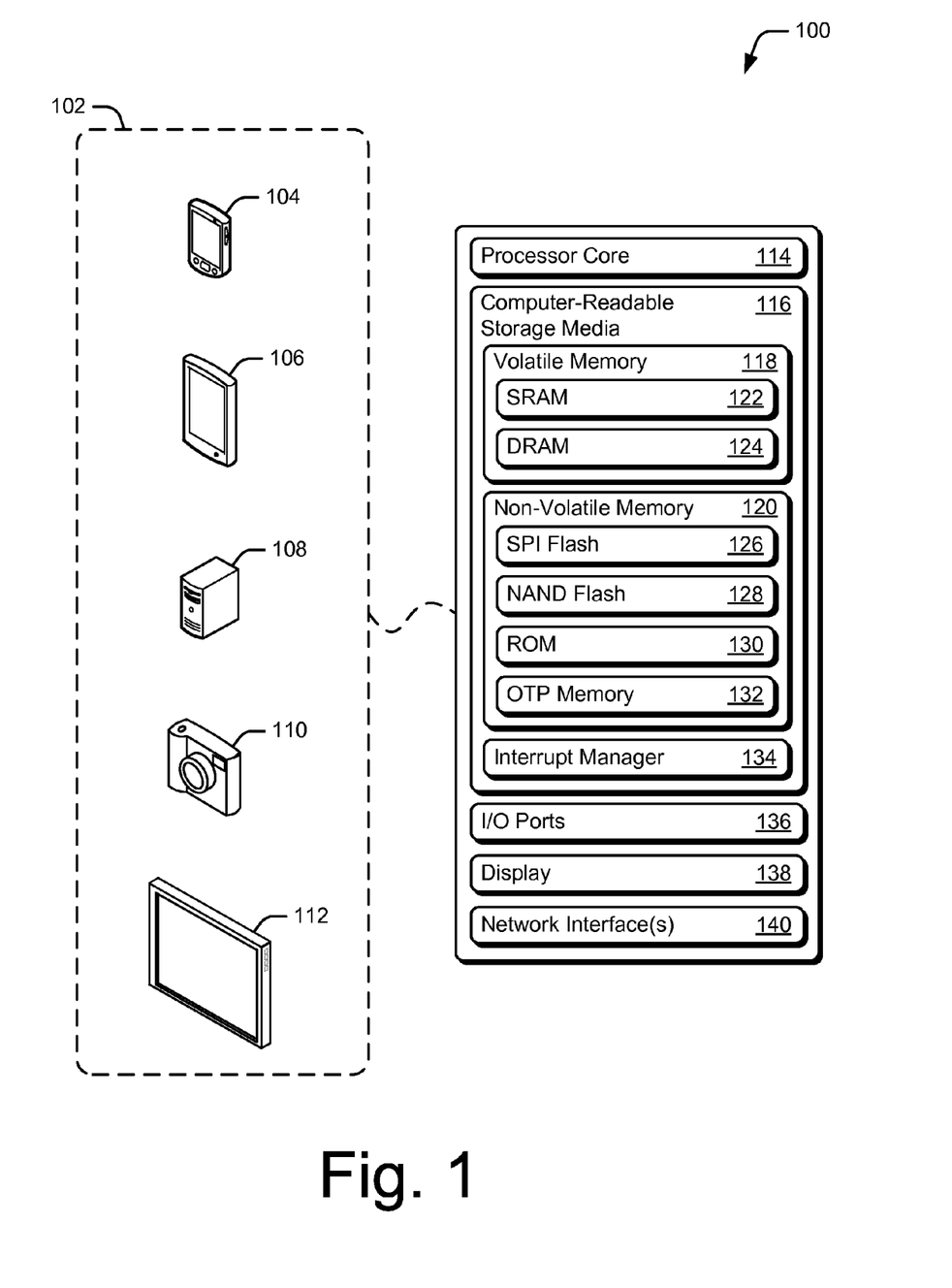
FIG. 1 illustrates an operating environment having computing devices in accordance with one or more aspects.

FIG. 1 illustrates an example of an operating environment 100 having computing devices 102, each of which are capable of communicating, accessing, presenting, or processing various data. Computing devices 102 include smartphone 104, tablet computer 106, network-attached storage drive 108 (NAS drive 108), digital camera 110, and internet-protocol enabled television 112 (IP TV 112). Although not shown, other configurations of computing devices 102 are also contemplated such as a desktop computer, server, mobile-internet device (MID), fax machine, printer, digital camcorder, netbook, ultra-book, gaming console, home automation terminal, mobile hotspot, networked media player, and the like.

Generally, computing devices 102 have operational states ranging from an "off" state to an "on" state. These operational states may include a fully off state (mechanical off), hibernation state, sleep state, suspend state, idle state, active state, and the like. When transitioning from a lower operational state to a higher operational state (e.g., from an off state to an active state), computing device 102 is booted. Booting computing device 102 includes executing low-level code (e.g., boot code or binary) that configures components or resources of computing device 102 for access by an operating system or higher-level applications.

Each computing device 102 includes processor core 114 (e.g. an application processor core) and computer-readable storage media 116 (CRM 116). Although shown as a single core, processor core 114 may be one of any suitable number and/or type of processing cores, which may be configured in any suitable manner (e.g., a heterogeneous multi-core application processor). In some cases, processor core 114 is implemented as a core of a microcontroller, embedded controller, or digital-signal processor.

CRM 116 includes volatile memory 118 and non-volatile memory 120, which may include any suitable type, combination, or number of internal and/or external memory devices. Each memory of CRM 116 may be implemented as an on-chip memory area of hardware or an off-chip memory device that communicates data with processor core 114 via a data interface or bus. In this particular example, volatile memory 118 includes static random access memory 122 (SRAM 122) and synchronous dynamic random-access memory 124 (DRAM 124). Alternately or additionally, volatile memory 118 may include other suitable types of memory, such as random-access memory (RAM), asynchronous dynamic RAM, double-data-rate RAM (DDR), and the like.

Non-volatile memory 120 includes serial-peripheral interface (SPI) Flash 126, NAND Flash 128, read-only memory 130, and one-time-programmable (OTP) memory 132. Other non-volatile memories contemplated include non-volatile RAM (NVRAM), electronically-erasable programmable ROM, embedded multimedia card (eMMC) devices, NOR Flash, single-level cell (SLC) Flash, multi-level cell (MLC) Flash, and the like. In this particular example, ROM 130 and OTP memory 132 are implemented as on-chip memory areas, which are manufactured into various metallic and semiconductor layers of a chip.

Non-volatile memory 120 stores data of computing device 102 persistently when powered-down or suspended. Boot code of computing device 102 is stored in one or more non-volatile memory components, such as SPI Flash 126, NAND Flash 128, and ROM 130. For example, lowest-level or secure boot code is written or burned into ROM 130 during manufacturing of the chip that includes ROM 130. By so doing, the boot code in ROM 130, also referred to as boot-ROM, cannot be modified after the chip is manufactured. The non-modifiable nature of ROM 130 ensures an authenticity and security of the boot code stored in ROM 130. Higher-level boot code of computing device 102 is implemented as boot loaders that are stored in SPI Flash 126 and NAND Flash 128, respectively. Because the contents of SPI Flash 126 and NAND Flash 128 are modifiable or user accessible, the higher-level boot code stored in these devices is not secure.

In some aspects, boot code is written to OTP memory 132, which is capable of being written to one time. OTP memory 132 includes blocks of fuses, each of which represents a settable binary value. More specifically, OTP memory 132 is manufactured with all of the fuses set to a virgin or default state, such as blocks of all ones or all zeroes. To write data into OTP memory 132, appropriate fuses are burned from their default state to a non-default state to indicate a desired binary value. Accordingly, once a fuse of OTP memory 132 is burned to the non-default state, the fuse is no longer useful to write other data to OTP memory 132. Alternately or additionally, contents of OTP memory 132 may be permanently locked by burning fuses of unused fuse blocks and error-correcting code bits associated with the unused fuse blocks.

Operating systems, applications, or user data (not shown) of computing device 102 may be stored by, or executed from, volatile memory 118, non-volatile memory 120, or any other suitable type of CRM 116. Alternately or additionally, operating systems and/or applications of computing device 102 may be embodied as firmware or other processor-executable instructions, binaries, or code. Operating systems and applications of device 102 are executable by processor core 114 to provide a user interface, various functionalities, and/or services of computing device 102.

CRM 116 also includes interrupt manager 134, which in this particular example, is embodied as processor-executable instructions that are executable by processor core 114 to implement various functionalities. Alternately or additionally, interrupt manager 134 may be implemented, in part or whole, via firmware or hardware (not shown) or any suitable combination thereof. In some cases, interrupt manager 134 is hard-coded into boot code of ROM 130 during the fabrication (e.g., manufacturing) of ROM 130 or a chip in which ROM 130 resides. Interrupt manager 134 may interrupt execution of boot code from ROM 130 to enable boot code to be executed from other memories. The implementation and use of interrupt manager 134 varies and is described below.

Computing device 102 may also include I/O ports 136, display 138, or network interface(s) 140. I/O ports 136 allow computing device 102 to interact with other devices or users. I/O ports 136 may include any combination of internal or external ports, such as USB ports, audio ports, Serial ATA (SATA) ports, PCI-express based ports or card-slots, secure digital input/output (SDIO) slots, and/or other legacy ports. Various peripherals may be operatively coupled with I/O ports 136, such as human-input devices (HIDs), external computer-readable storage media, or other peripherals.

Display 138 may present a user interface or rendered graphics associated with an operating system or application of computing device 102. Display 138 may include a touch-input sensor (not shown), such as a touch screen or touch-sensitive overlay. Network interface(s) 140 provides connectivity to one or more networks and other devices connected therewith. Data communicated over network interfaces 140 may be packetized or framed depending on a communication protocol or standard by which computing device 102 is communicating. Network interfaces 140 may include wired interfaces, such as Ethernet or fiber optic interfaces for communication over a local network, intranet, or the Internet. Network interfaces 140 may also include wireless interfaces that facilitate communication over wireless networks, such as wireless LANs, cellular networks, or wireless personal-area-networks (e.g., Bluetooth™).

Figure 2:
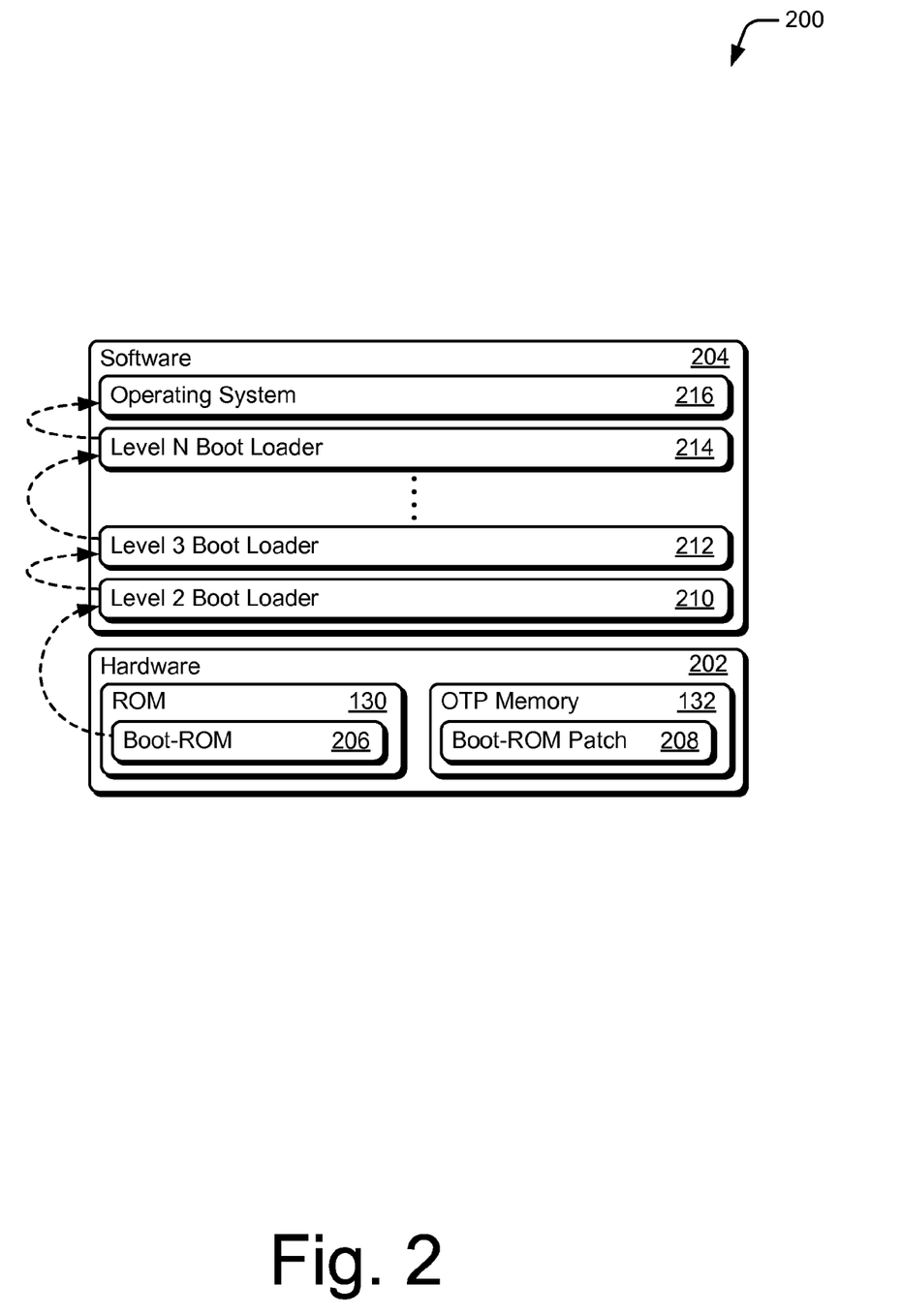
FIG. 2 illustrates an example boot architecture of a computing device in accordance with one or more aspects.

FIG. 2 illustrates an example boot architecture of a computing device in accordance with one or more aspects at 200. Execution of boot code during a boot process occurs in hardware 202 and software 204 of a computing device. Hardware 202 includes ROM 130, into which a binary of boot code (boot-ROM 206) is burned during manufacture of ROM 130. Boot-ROM 206 is executed to initiate a boot process of the computing device. Because boot-ROM 206 is burned to ROM 130 and not modifiable, execution of boot-rom 206 can implement a trusted boot process in which boot-ROM 206 functions as a "root of trust". More specifically, once boot-ROM 206 is written to ROM 130, the read-only nature of ROM 130 ensures an authenticity and security of boot-ROM 206.

Hardware 202 also includes OTP memory 132 that is configured as blocks of fuses that are capable of storing binary values. In this particular example, OTP memory 132 stores boot-ROM patch 208, which includes binary code that is executed during the boot sequence of the computing device. In some cases, boot-ROM patch 208 includes alternate boot code that is executing instead of a portion of boot-ROM 206, such as when the portion of boot-ROM 206 includes an error or bug. In other cases, boot-ROM patch 208 includes additional boot code that is executed in conjunction with boot-ROM 206. In such cases, the execution of the additional boot code may implement additional or functionalities of the computing device during the boot sequence. The implementation and use of code written to OTP memory varies and is described below.

During the boot sequence, the execution of boot-ROM 206 loads a higher-level boot loader into software 204, which in turn loads another higher-level boot loader, and the boot sequence continues until an operating system is loaded. In this particular example, execution of boot-ROM 206 loads level 2 boot loader 210 from SPI Flash 126. Before transferring control of resources to level 2 boot loader 210, boot-ROM 206 validates an authenticity of code of the boot loader by verifying a cryptographic signature or hash. By so doing, boot-ROM 206 ensures that the next level boot loader is secure (e.g., not tampered with) and a chain of trust is established from the "root of trust" to a next step of the boot sequence.

Once control of resources is passed from boot-ROM 206 to level 2 boot loader 210, execution of the boot loader further configures resources of the computing device and loads level 3 boot loader 212 from NAND Flash 128. Here, to continue the chain of trust, level 2 boot loader 210 validates an authenticity of 3 boot loader 212 before control of the resources is transferred to 3 boot loader 212. As shown in FIG. 2, the boot sequence continues until level N boot loader 214 is loaded, validated, and executed as the boot sequence progresses through any number of intermediate boot loaders. To implement a trusted boot process, an authenticity of each level of boot code or boot loader is validated by a previous boot loader.

To conclude the boot sequence, execution of level N boot loader 214 loads operating system 216 from non-volatile 120 and validates an authenticity of the operating system by verifying a cryptographic signature or hash value associated with operating system 216. By so doing, a trusted boot process is implemented to ensure that the software executing on the computing device is authentic and authorized. The "root of trust" of the trusted boot process is boot-ROM 206, which is guaranteed to be secure due to the inability to alter ROM 130 once the memory is manufactured.

Techniques of Patching Boot Code of Read-Only Memory

The following discussion describes techniques of patching boot code of read-only memory. These techniques can be implemented using the previously described environment or entities, such as interrupt manager 134 of FIG. 1 embodied on a computing device 102. These techniques include methods illustrated in FIGS. 3, 4, and 6, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2 and 5 by way of example. Such reference is not to be taken as limited to operating environment 100 but rather as illustrative of one of a variety of examples.

Figure 3:
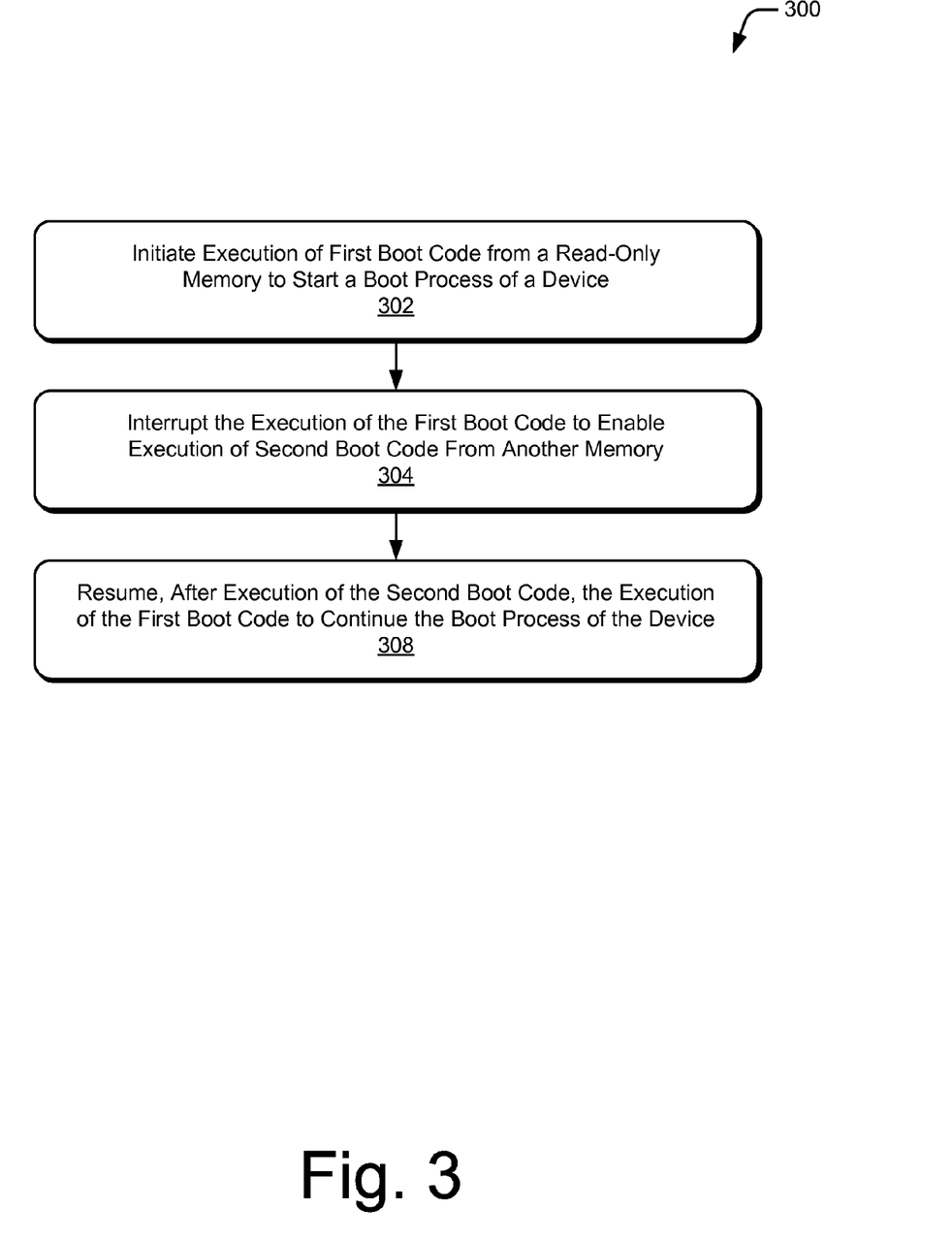
FIG. 3 illustrates a method for interrupting execution of boot code from a read-only memory.

FIG. 3 depicts a method 300 for interrupting execution of boot code from a read-only memory, including operations performed by interrupt manager 134 of FIG. 1.

At 302, execution of first boot code from a read-only memory (ROM) is initiated. Initiating execution of the first boot code starts a boot process of a computing device. In some cases, the first boot code is a secure boot-ROM that is burned into hardware during manufacture of the ROM. Initiating the execution of the first boot code can be responsive to a power-on event of the computing device. For example, when a smart phone or tablet computer is powered on, a microcontroller or hardware logic circuit can initiate execution of a boot-ROM binary.

At 304, execution of the first boot code is interrupted to enable execution of second boot code from another memory. The execution of the first boot code is interrupted at a predetermined point effective to halt execution of the first boot code. The predetermined point may be an address or instruction in the first boot code that triggers an interrupt, break, jump, and the like. When the first boot code is not executing, second boot code can be executed from another memory of the computing device. In some cases, the second boot code is executed instead of a portion of the first boot code, such as a portion that contains a bug or error. In other cases, execution of the second boot code provides an additional function or feature during the boot process of the device.

At 306, the execution of the first boot code from the ROM is resumed after execution of the second boot code. Resuming execution of the first boot code from ROM continues the boot process of the device. In some cases, the execution of the first boot code is resumed at a predetermined return point, such as a return address. Continued execution of the first boot code may load a high-level boot loader or an operating system of the device. In some cases, authenticity of the higher-level boot loader or operating system is verified before control of device resources is passed from the first boot code. This can be effective to implement a trusted boot process in which each level or layer of the boot process is validating before control of the device is transferred from a lower-level boot loader. By executing root level boot code from ROM and OTP memory, security of the lowest-level boot code is ensured due to the non-modifiable nature of these memories.

Figure 4:
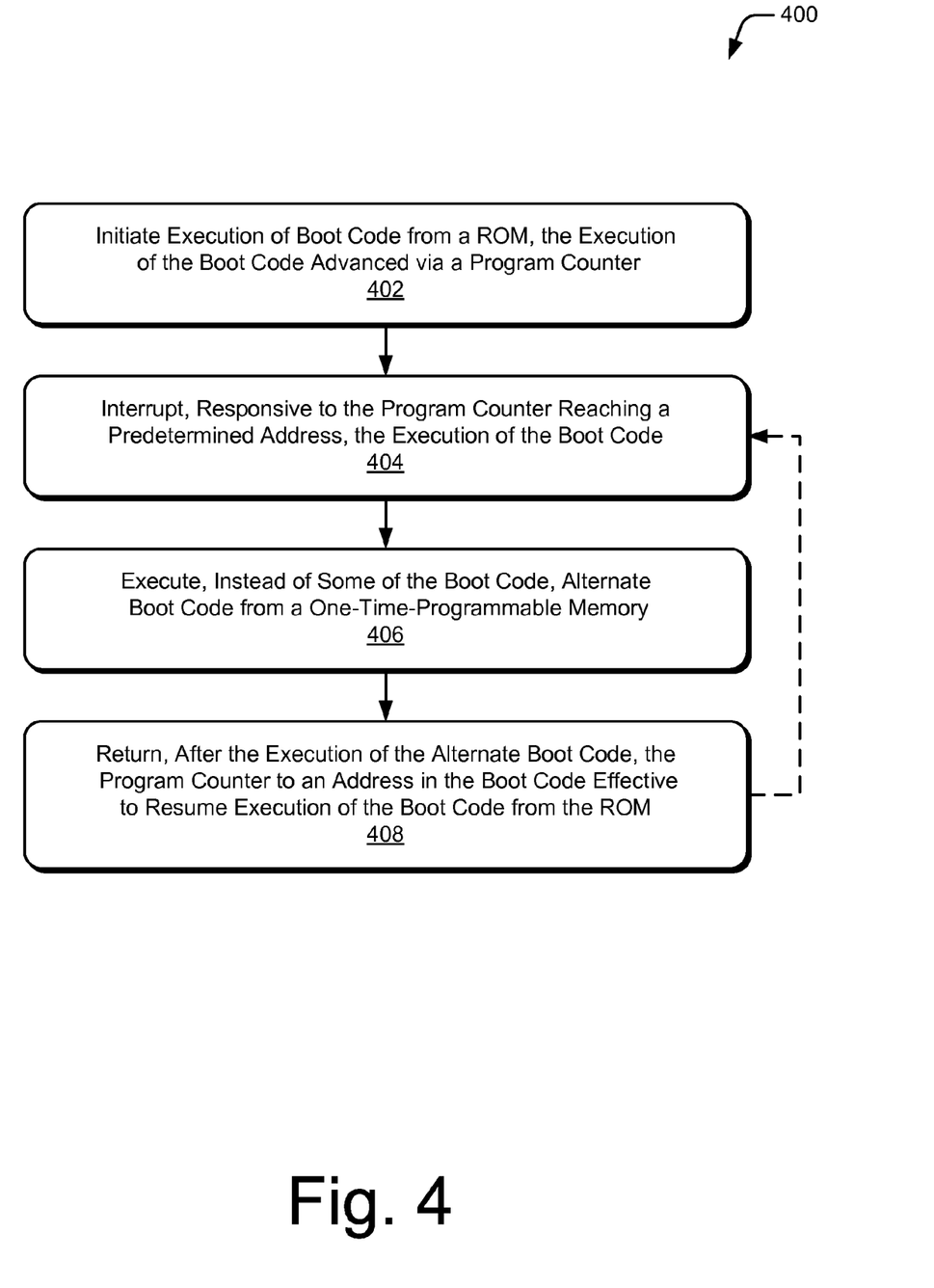
FIG. 4 illustrates a method for executing alternate boot code from a one-time-programmable memory.

FIG. 4 depicts a method 400 for executing alternate boot code from a one-time-programmable memory, including operations performed by interrupt manager 134 of FIG. 1.

At 402, execution of boot code from a read-only memory (ROM) is initiated. The boot code stored in the ROM may include a boot-ROM binary that is executed to boot a computing device. In some cases, the boot-ROM is burned into physical conductor or semi-conductor layers of the ROM and is not modifiable. In such cases, the boot-ROM is a secure boot-ROM and can function as a "root of trust" for a trusted boot process. Execution of the boot code is advanced by a program counter that increments through addresses of the boot to cause execution of instructions associated with each address.

Figure 5:
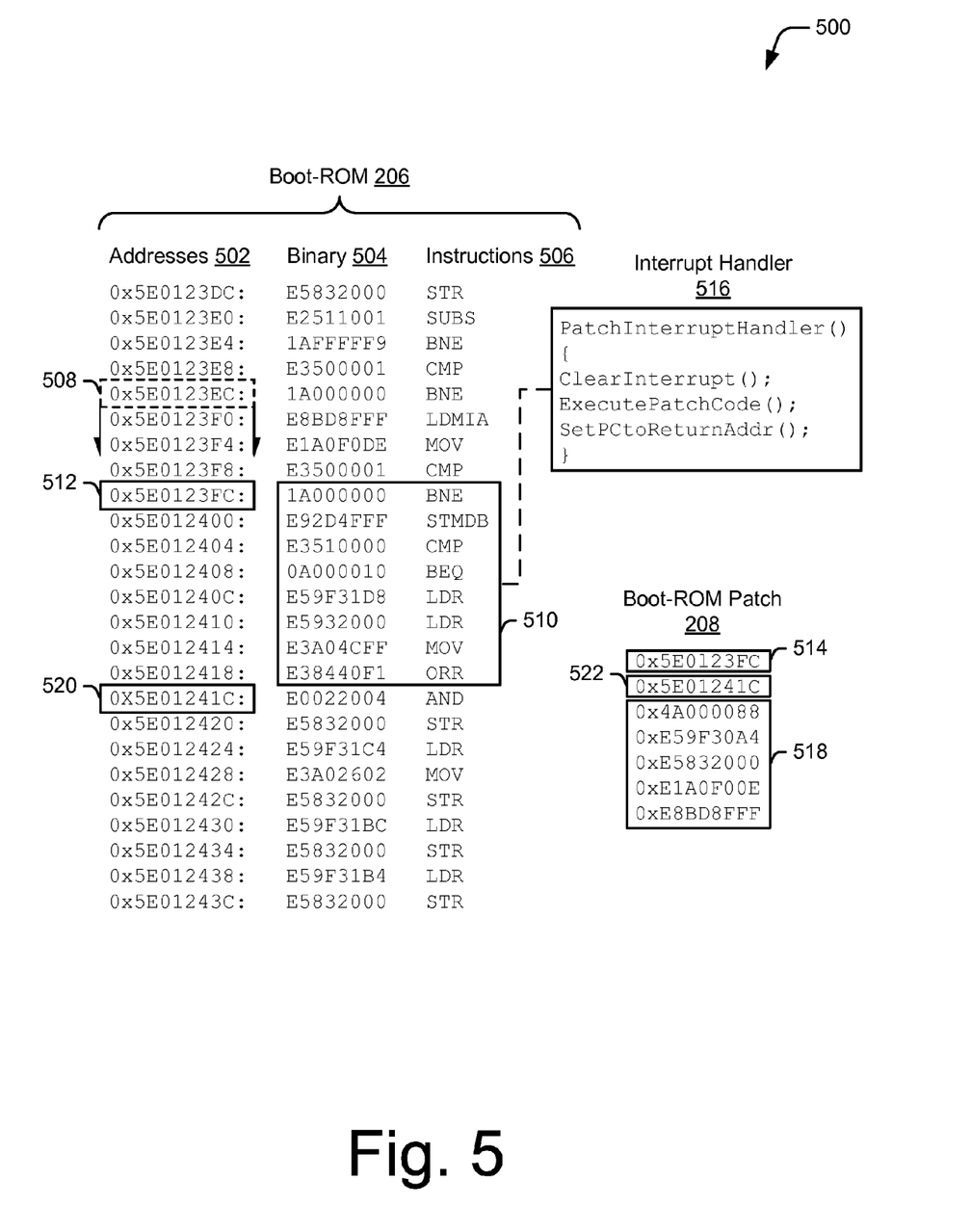
FIG. 5 illustrates examples of boot code and a boot code patch in accordance with one or more aspects.

As an example, consider a user powering-on smart phone 104 of FIG. 1. Assume here that smart phone 104 is booting to an "on" state from an "off" state in which components and resources of smart phone 104 were powered down. To boot to the "on" state, boot-ROM 206 begins to execute in response to the user powering-on smart phone 104. As shown in FIG. 5, boot-ROM 206 includes addresses 502 and binary 504, which is converted from binary to machine code instructions (instructions 506) when executed. Processor core 114 of smart phone 104 executes a line of binary 504, or a corresponding instruction 506, as program counter 508 progresses through addresses 502.

At 404, the execution of the boot code from the ROM is interrupted. This can be responsive to a program counter reaching a predetermined address in the boot code. The predetermined address may be stored in a different memory, such as a one-time-programmable memory to ensure the predetermined address cannot be modified. In some cases, an interrupt service routine (e.g., hardware-based interrupt logic) is configured to fire an interrupt when the program counter reaches the predetermined address in the boot code. In such cases, the fired interrupt may be effective to cause an interrupt handler to execute other code. The predetermined address may indicate a line of boot code that includes an error or bug, the execution of which is to be prevented. Alternately or additionally, the predetermined address may be a first address of a section of boot code that includes an error or bug.

In the context of the present example, assume that boot-ROM section 510 includes an error that, responsive to execution, prevents smart phone 104 from powering on. Accordingly, address 512 (0x5E0123FC) is selected to initiate an interrupt process to prevent the execution of the "BNE" instruction. The address selected to fire the interrupt is written into boot-ROM patch 208 as interrupt address 514. When program counter 508 reaches interrupt address 514, interrupt manager 134 fires an interrupt effective to prevent processor core 114 from executing the "BNE" instruction.

At 406, alternate boot code is executed from a one-time programmable (OTP) memory. This alternate boot code is executed instead of a portion of the boot code stored in the ROM. In some cases, the execution of the alternate boot code is responsive to an interrupt fired during execution of the boot code from ROM. In such cases, the interrupt can be cleared by an interrupt handler configured to execute the alternate boot code. This interrupt handler may be implemented or configured during earlier execution of the boot code.

Continuing the ongoing example, interrupt handler 516 clears the interrupt fired by interrupt manager 134. While the execution of boot-ROM 206 is paused, interrupt handler 516 executes patch binary 518 of boot-ROM patch 208, which is stored in OTP memory 132. Here, patch binary 518 is executed instead of boot-ROM section 510 and the execution of the erroneous code in boot-ROM section 510 is prevented. By so doing, the code of boot-ROM section 510 can be patched without altering or modifying the contents of ROM 130. Additionally, because patch binary 518 is burned into OTP memory 132, the "root of trust" of the boot code is maintained because contents of the OTP memory cannot be modified once burned.

At 408, the program counter is returned to an address in the boot code effective to resume execution of the boot code from the ROM. The return address in the boot code can be configured such that one or more instructions of the boot code are skipped. Optionally, method 400 may return to operation 404 to interrupt execution of the boot code from the ROM. For example, in some cases, multiple sections of boot code may be patched. As such, iterations of operations 404 through 408 of method 400 may be performed any suitable number of times to execute additional binaries to patch the boot code stored in ROM.

Concluding the ongoing example, assume that address 520 (0x5E01241C), which follows boot-ROM section 510, is burned into boot-ROM patch 208 as return address 522. Here, interrupt handler 516 sets program counter 508 to return address 522 after execution of patch binary 518. This is effective to cause processor core 114 to skip boot-ROM section 510 and resume execution of boot-ROM 206 at address 520. Once execution of boot-ROM 206 loads a boot loader of smart phone 104, the boot-ROM 206 verifies the boot loader as authentic and passes control to the boot loader to continue booting smart phone 104.

Figure 6:
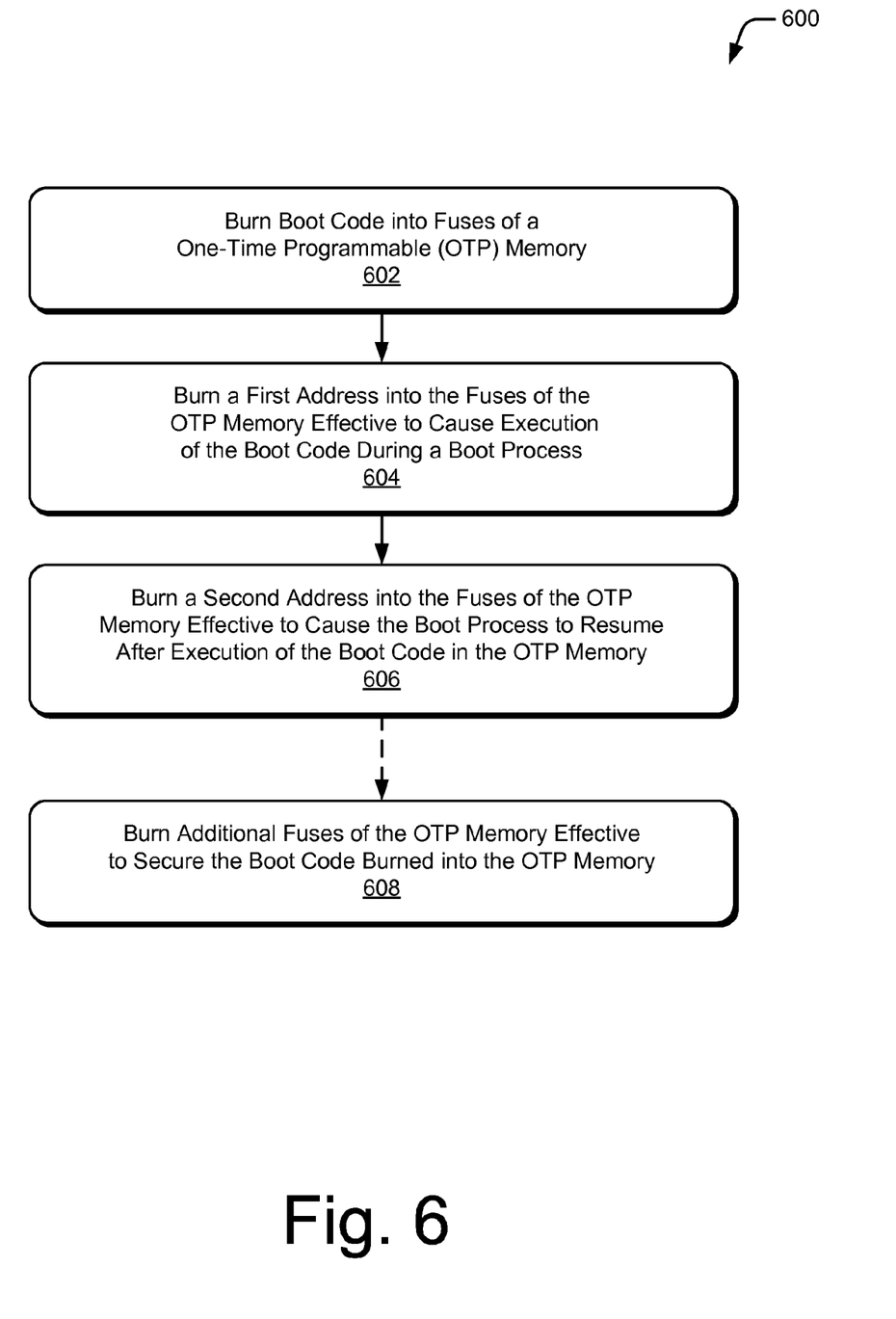
FIG. 6 illustrates a method for burning boot code into fuses of a one-time-programmable memory.

FIG. 6 depicts a method 600 for burning boot code into fuses of a one-time-programmable memory.

At 602, boot code is burned into fuses of a one-time programmable (OTP) memory. The boot code may be alternate boot code or additional boot code that supplements other boot code stored in a read-only memory (ROM), such as a boot-ROM binary. By way of example, consider a trusted boot-ROM binary that includes multiple sections of code, one of which contains an error. A patch binary designed to execute in place of the erroneous section of boot-ROM is burned into the fuses of an OTP memory. As such, execution of the boot code burned into the fuses during a boot sequence can be effective to patch the error (or bug) in the boot-ROM.

At 604, a first address for an interrupt service is burned into the fuses of the OTP. Inclusion of this first address in the OTP memory can be effective to cause the interrupt service to fire an interrupt when a program counter encounters the first address. Alternately or additionally, the first address is effective to cause execution of boot code from the OTP memory during a boot sequence. In the context of the example above, an address located ahead of the error in the boot-ROM is burned into the fuses of the OTP memory. By selecting an address that is ahead of the error, execution of the boot-ROM is interrupted by the interrupt service before the error is encountered. Additionally, when a program counter reaches this address, an interrupt handler can be caused to execute the patch binary instead of the section of boot-ROM that includes the error.

At 606, a second address for an interrupt service is burned into the fuses of the OTP. Inclusion of this second address in the OTP memory can be effective to cause the interrupt service to set the program counter to the second address after an interrupt is serviced. In some cases, the second address is located within boot code executed from the ROM, such as boot-ROM. By setting the program counter to an address in the boot-ROM, execution of the boot-ROM can be resumed from the address at which the program counter is set.

In some cases, the second address does not immediately follow an address from which an interrupt is initiated. In such cases, this can be effective to prevent execution of a particular portion or section of boot code. Continuing the ongoing example, an address located after the error in the boot-ROM is burned into the fuses of the OTP memory. As such, binary of the boot-ROM located between the addresses burned into the fuses of the OTP memory is not executed.

Optionally at 608, additional fuses of the OTP memory are burned to secure data previously burned into the OTP memory. The additional fuses are fuses of unused blocks of the OTP memory and fuses of error-correcting code bits associated with the unused blocks. By so doing, the OTP memory cannot be modified, which is effective to secure the contents of the OTP memory, such as boot code patches. Alternately or additionally, a stock-keeping unit (SKU) number associated with the OTP memory can be updated or altered to reflect the functionality provided by the boot code burned into the OTP memory. For example, a SKU number of a chip that includes an OTP memory storing a boot-ROM patch can be revised to reflect the inclusion of the boot-ROM patch within the chip.

System-on-Chip

Figure 7:
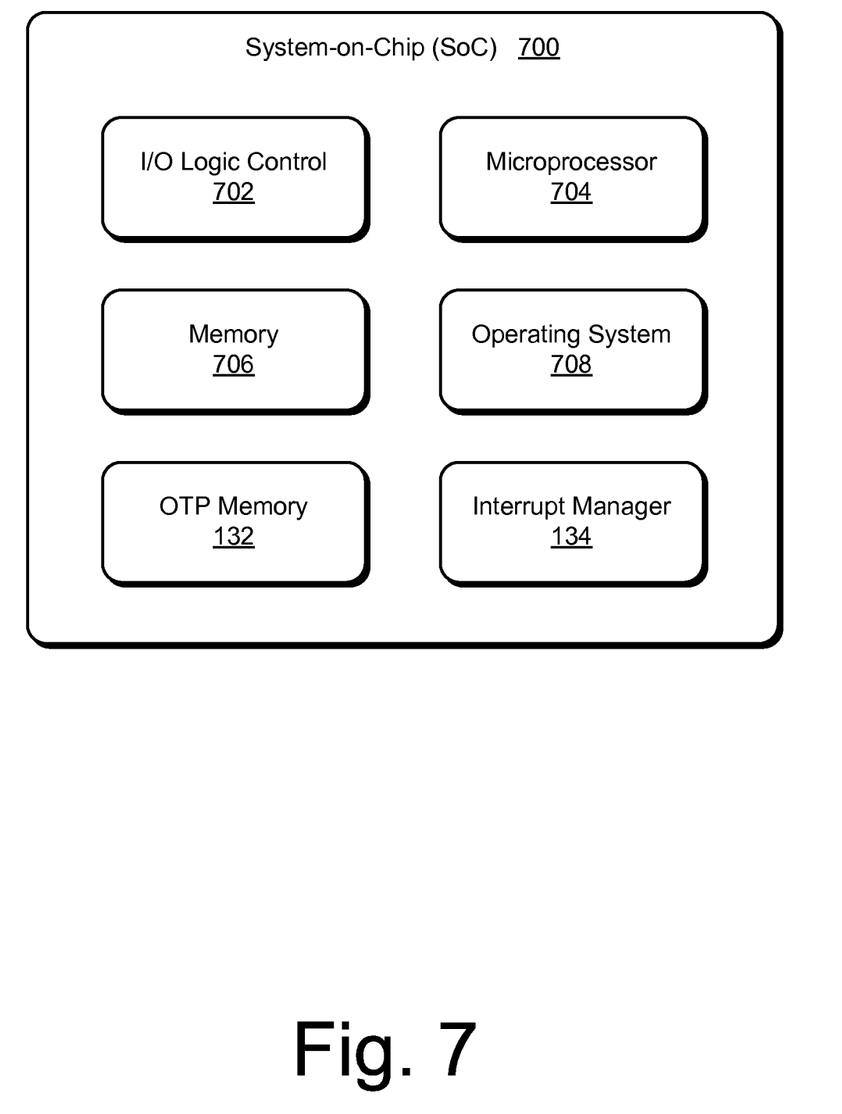
FIG. 7 illustrates a System-on-Chip (SoC) environment for implementing aspects of the techniques described herein.

FIG. 7 illustrates a System-on-Chip (SoC) 700, which can implement various aspects of loading boot code from multiple memories. A SoC can be implemented in any suitable device, such as a video game console, IP-enabled television, smart-phone, laptop computer, personal navigation device, access point, wireless router, cellular broadband router, tablet computer, server, network-enabled printer, set-top box, printer, scanner, camera, picture frame, home appliance, thermostat, home automation device, and/or any other type of electronic device.

SoC 700 can be integrated with electronic circuitry, a microprocessor, memory, input-output (I/O) logic control, communication interfaces, other hardware, firmware, and/or software needed to provide functionalities of a device, such as any of the above-listed devices. SoC 700 can also include an integrated data bus (not shown) that couples the various components of the SoC for data communication between the components. An electronic or computing device that includes SoC 700 can also be implemented with many combinations of differing components. In some cases, these differing components may be configured to implement concepts described herein over various internal or external data interfaces.

In this example, SoC 700 includes various components such as an input-output (I/O) logic control 702 (e.g., to include electronic circuitry) and microprocessor 704. SoC 700 also includes memory 706, which can be any type and/or combination of RAM, SRAM, DRAM, Flash, low-latency nonvolatile memory, ROM, and/or other suitable electronic data storage. In at least some aspects, boot code of SoC 700 is stored in a portion of memory 706 that is implemented as ROM.

SoC 700 also includes one-time-programmable memory 132 (OTP memory 132) in which additional or alternate boot code is stored. This alternate or additional boot code can be used as described herein to implement one or more aspects of patching boot code of ROM. By way of example and in the context of SoC 700, the ability to trap on a desired patch address is a feature implemented by the System-On-Chip based on one-time-programmable fuses of OTP 132. Once other boot code (e.g., patch code) is executed in response to encountering the desired patch address, execution of boot code from ROM is resumed to continue booting a computing device in which SoC 700 is embodied.

Alternately or additionally, SoC 700 may comprise data interfaces (not shown) for accessing additional or external off-chip memory, such as external SRAM, DRAM, or Flash memory. Although not shown, the external memory (or memory 706) may include multiple non-volatile memory devices storing multiple respective boot loaders and/or portions of boot code, as described with reference to FIG. 1. SoC 700 can also include various firmware and/or software, such as operating system(s) 708, which can be computer-executable instructions maintained by memory 706 and executed by microprocessor 704. SoC 700 may also include other various communication interfaces and components embodied as hardware, firmware, software, or any suitable combination thereof.

SoC 700 also includes interrupt manager 134, which may be embodied as disparate or combined components, logic, routines, or services. Examples of these various components, functions, and/or entities, and their corresponding functionality, are described with reference to the respective components of the environment 100 and various configurations as illustrated by FIGS. 2 and 5. Interrupt manager 134, either independently or in combination with other entities (e.g., an interrupt service routine), can be implemented as computer-executable instructions maintained by memory 706 and executed by microprocessor 704 to implement various embodiments and/or features described herein. Interrupt manager 134 may also be provided integral with other entities of the SoC, such as hardware interrupt logic associated with microprocessor 704 or another suitable software, firmware, or hardware component within SoC 700. Alternatively or additionally, interrupt manager 134 and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   initiating, from a first read-only memory (ROM), execution of first boot code to start a boot process of a computing device, the execution of the first boot code being advanced in accordance with a program counter of a processor executing the first boot code, the first boot code executed directly from the first ROM;
   accessing, via a hardware-based interrupt manager that is separate from the processor, a second ROM storing a boot-ROM patch including a first predefined address of the first boot code, a second predefined address of the first boot code, and second boot code:

monitoring, via the hardware-based interrupt manager, the program counter or the processor until the program counter reaches the first predefined address of the first boot code;

interrupting, via the hardware-based interrupt manager and responsive to the program counter reaching the first predefined address of the first boot code, the execution of the first boot code by the processor to enable execution of the second boot code stored in the second ROM;

causing, while the execution or the first boot code is interrupted, the processor to execute the second boot code directly from the second ROM:

setting the program counter to the second predefined address of the first boot code, the second predefined address being different from the first predefined address effective to prevent execution of at least a portion of the first boot code stored in the first ROM; and resuming, after the second boot code is executed and from the second predefined address to which the program counter is set, the execution of the first boot code directly from the first ROM to continue the boot process of the computing device without executing the portion of the first boot code stored in the first ROM.

2. The method as recited in claim 1, wherein:
the second ROM is one-time-programmable (OTP) memory having fuses into which the first predefined address, second predefined address and second boot code are burned; and
other fuses of the OTP memory being burned effective to prevent other addresses or other boot code from being written to the OTP memory.

3. The method as recited in claim 1, wherein execution of the first boot code is effective to implement an interrupt service routine, the hardware-based interrupt manager interrupts execution of the first boot code by setting an interrupt, and the interrupt service routine causes execution of the second boot code stored in the second ROM responsive to the interrupt being set.

4. The method as recited in claim 3, further comprising:
clearing, via the interrupt service routine, the interrupt set by the hardware-based interrupt manager;
setting, via the interrupt service routine, the program counter of the processor to the second predefined address; and
resuming, via the interrupt service routine, the execution of the first boot code from the second predefined address to which the program counter is set.

5. The method as recited in claim 1, wherein the first boot code is written into the first ROM during manufacture of a device or chip in which the first ROM is embodied.

6. The method as recited in claim 3, wherein the method further comprises reading, via the interrupt service routine, the second predefined address from the second ROM.

7. The method as recited in claim 3, wherein the interrupt service routine is dedicated to servicing the interrupt set by the hardware-based interrupt manager and is configured to return the program counter to the second predefined address instead of an address subsequent the first predefined address.

8. A method comprising:
initiating execution of first boot code from a read-only memory (ROM), the execution of the first boot code being advanced in accordance with a program counter of a processor executing the first boot code, the first boot code executed by the processor directly from the ROM;

accessing, via a hardware-based interrupt manager that is separate from the processor, a first predefined address in a boot-ROM patch, the boot-ROM1 patch stored in a one-time-programmable (OTP) memory;

comparing, via the hardware-based interrupt manager, values of the program counter to the first predefined address;

interrupting, via the hardware-based interrupt manager and responsive to the program counter reaching the first predefined address, the execution of the first boot code by setting a hardware-based interrupt;

executing, via the processor and instead of a portion of the first boot code, second boot code of the boot-ROM patch stored in the OTP memory, the second boot code executed by the processor directly from the OTP memory; and returning, responsive to completing execution of the second boot code and based on a second predefined address stored in the boot-ROM patch, the program counter to the second predefined address effective to resume execution of the first boot code by the processor and directly from the ROM, the second predefined address being different from the first predefined address such that the first boot code is executed without executing the portion of the first boot code stored in the ROM.

9. The method as recited in claim 8, wherein execution of the first boot code and the second boot code is effective to load a boot loader and the method further comprises, prior to transferring control to the boot loader, verifying a cryptographic signature or cryptographic hash of the boot loader to ensure authenticity of the boot loader.

10. The method as recited in claim 8, wherein the execution of the first boot code is interrupted by a hardware-based interrupt and the method further comprises, prior to executing the second boot code, clearing the hardware-based interrupt.

11. The method as recited in claim 8, wherein the portion of the first boot code includes a coding error, and the second predefined address to which the program counter is returned is located subsequent to the coding error in the first boot code such that the coding error is not executed.

12. The method as recited in claim 8, wherein the first boot code is burned into the ROM and the second boot code is burned into the OTP memory such that execution of the first boot code and the second boot code implements at least part of a trusted boot process.

13. The method as recited in claim 8, wherein the second predefined address is different from the first predefined address such that execution of at least one line of the first boot code is prevented.

14. A System-on-Chip comprising:
a processor configured to execute, in accordance with a program counter, code to hoot a device in which the System-on-Chip is embodied:
a read-only memory (ROM) storing first boot code for the device;
a one-time-programmable (OTP) memory storing a boot-ROM patch including a first predefined address, a second predefined address, and second boot code for the device;
a register configured to store an address for the program counter; and
a hardware-based interrupt manager that is separate from the processor and configured to:
compare, as the processor executes the first boot code directly from the ROM, values of the program counter to the first predefined address;

interrupt execution of the first boot code directly from the ROM in response to one of the program counter values matching the first predefined address;

cause the second predefined address stored in the OTP to be written to the register;

cause the processor to execute the second boot code directly from the OTP memory; and cause, after the second boot code is executed directly from the OTP memory, the second predefined address in the register to be loaded into the program counter effective to resume execution of the first boot code directly from the ROM, the second predefined address being different from the first predefined address such that setting the program counter to the second predefined address is effective to execute the first boot code without executing at least a portion of the first boot code.

15. The System-on-Chip of claim 14, wherein the OTP memory includes one or more blocks of fuses to store data, and the first predefined address, second predefined address, and second boot code are burned into one or more blocks of the fuses.

16. The System-on-Chip of claim 15, wherein other blocks of the fuses and error-correction code bits associated with the unused blocks of the fuses are burned such that contents of the OTP memory cannot be modified.

17. The System-on-Chip of claim 14, wherein the device in which the System-on-Chip is embodied comprises one of a computing device, electronic device, or communication device.

18. The System-on-Chip of claim 14, wherein the first boot code includes a coding error and the second boot code includes patch code for the coding error of the first boot code.

19. The System-on-Chip of claim 14, wherein the hardware-based interrupt manager interrupts the execution of the first boot code by setting a hardware-based interrupt that is serviced by an interrupt service handler implemented by the first boot code.

20. The System-on-Chip of claim 19, wherein the interrupt service handler is further configured to clear the interrupt prior to the execution of the second boot code.

* * * * *